US012365103B2

(12) United States Patent
Liu

(10) Patent No.: US 12,365,103 B2
(45) Date of Patent: Jul. 22, 2025

(54) PAPER SEPARATOR PROVIDED WITH ADHESIVE TAPE CUTTING ASSEMBLY

(71) Applicant: Yong Liu, Zhejiang (CN)

(72) Inventor: Yong Liu, Zhejiang (CN)

( * ) Notice: Subject to any disclaimer, the term of this patent is extended or adjusted under 35 U.S.C. 154(b) by 0 days.

(21) Appl. No.: 19/024,224

(22) Filed: Jan. 16, 2025

(65) Prior Publication Data

US 2025/0196377 A1 Jun. 19, 2025

Related U.S. Application Data

(63) Continuation-in-part of application No. 18/797,836, filed on Aug. 8, 2024, and a continuation-in-part of application No. 18/539,909, filed on Dec. 14, 2023, now Pat. No. 12,090,678.

(30) Foreign Application Priority Data

Jan. 4, 2025 (CN) ........................ 202520016406.2

(51) Int. Cl.
*B26B 27/00* (2006.01)
*B26B 3/08* (2006.01)
*B26B 29/06* (2006.01)
*B26D 1/01* (2006.01)
*B26D 1/04* (2006.01)

(52) U.S. Cl.
CPC ..................................... *B26B 3/08* (2013.01)

(58) Field of Classification Search
CPC ........... B26B 27/00; B26B 3/08; B26B 29/06; B26D 2001/006; B26D 1/045; B26D 2210/11; B65H 2701/5112; B65H 35/002; B65H 2301/51532; B65H 2701/1944; B65H 2301/515123; B65H 2301/515; B65H 2301/51512; B65H 2301/515126
USPC ..... 30/278, 2, 280, 294, 289, 298.4; 83/651, 83/614, 635, 649; D8/14, 48, 98; D18/34.3, 34.8
See application file for complete search history.

(56) References Cited

U.S. PATENT DOCUMENTS 2,229,961 A * 1/1941 Deane .................. B65H 35/008 206/53
2,290,223 A * 7/1942 Black ....................... D06H 7/02 83/567
2,663,369 A * 12/1953 Erhardt .............. B65H 35/0026 225/21
3,176,572 A * 4/1965 Comet ............... B65H 35/0093 83/522.19

(Continued)

FOREIGN PATENT DOCUMENTS

DE 202013003963 U1 * 9/2014 ............. B26D 1/105
GB 2528171 A * 1/2016 ............. B65B 67/08

*Primary Examiner* — Ghassem Alie

(57) ABSTRACT

A paper separator provided with an adhesive tape cutting assembly includes a housing structure and an adhesive tape cutting assembly, where a housing has an open first end and an open second end, the first end and the second end are axially through and forms a cavity capable of accommodating a paper roll inside the housing; a cavity opening is formed in an outer wall of the housing and is axially formed from the first end to the second end; and the adhesive tape cutting assembly is fixedly mounted on the outer wall of the housing and is configured to be sleeved with an adhesive tape roll and cut an adhesive tape.

12 Claims, 8 Drawing Sheets

(56) References Cited

U.S. PATENT DOCUMENTS

| | | | | | |
|---|---|---|---|---|---|
| 3,199,394 | A * | 8/1965 | Castelli | B65H 35/0026 | |
| | | | | 83/578 | |
| 3,991,923 | A * | 11/1976 | Nishikawa | B65H 35/0026 | |
| | | | | 225/21 | |
| 4,739,943 | A * | 4/1988 | Geller | A47K 10/32 | |
| | | | | 242/598.6 | |
| 5,307,717 | A * | 5/1994 | Winston | B65H 35/002 | |
| | | | | 83/522.11 | |
| 5,445,703 | A * | 8/1995 | Steeves | B65H 35/004 | |
| | | | | 156/577 | |
| 5,478,000 | A * | 12/1995 | Jensen | B65H 35/0066 | |
| | | | | 83/337 | |
| 5,850,960 | A * | 12/1998 | Cadwell | B65H 35/0006 | |
| | | | | 225/77 | |
| 7,152,650 | B2 * | 12/2006 | Van Tyle | B65H 35/0033 | |
| | | | | 156/577 | |
| 8,714,428 | B2 * | 5/2014 | Mallard | B65D 83/0841 | |
| | | | | 225/77 | |
| D915,507 | S * | 4/2021 | Cran | D18/34.9 | |
| 11,717,977 | B1 | 8/2023 | Xie | | |
| 2023/0039376 | A1 | 2/2023 | Moroyama | | |
| 2023/0057453 | A1 * | 2/2023 | North | B65H 35/06 | |
| 2024/0042456 | A1 | 2/2024 | Wang | | |
| 2024/0227216 | A1 | 7/2024 | Yaguchi | | |

* cited by examiner

PAPER SEPARATOR PROVIDED WITH ADHESIVE TAPE CUTTING ASSEMBLY

CROSS REFERENCE TO RELATED APPLICATIONS

This application claims priority benefits to Chinese Patent Application No. 2025200164062, filed on Jan. 4, 2025, and is a continuation-in-part of U.S. patent application Ser. No. 18/797,836 filed on Aug. 8, 2024, which is a continuation-in-part of U.S. patent application Ser. No. 18/539,909, filed on Dec. 14, 2023.

TECHNICAL FIELD

Embodiments of the present application relate to the field of paper separators and adhesive tape cutting apparatuses, in particular to a paper separator provided with an adhesive tape cutting assembly.

BACKGROUND

There are common demands for paper and adhesive tape processing in office, home and industrial environments. Traditional paper separation devices and adhesive tape cutting tools are usually independently designed and are respectively used for paper separation and adhesive tape cutting. The plurality of independent tools need more storage space, which increases the disorder degree of a desktop or a working area.

SUMMARY

An embodiment of the present application provides a paper separator provided with an adhesive tape cutting assembly, including a housing structure and an adhesive tape cutting assembly, where the housing structure includes: a housing which has an open first end and an open second end, the first end and the second end being axially through and forming a cavity capable of accommodating a paper roll inside the housing; a cavity opening which is formed in an outer wall of the housing, is axially formed from the first end to the second end, and is in communication with the accommodating cavity, to-be-cut paper of the paper roll in the accommodating cavity being selectively pulled out from the cavity opening, and paper separation being performed by means of a first side wall of the housing adjacent to the cavity opening; and the adhesive tape cutting assembly is fixedly mounted on the outer wall of the housing and is configured to be sleeved with an adhesive tape roll and cut an adhesive tape. The housing structure disclosed in the above embodiment has the open first end, the open second end, and the axially through accommodating cavity, which allows easy loading and replacement of the paper roll. Such design simplifies the loading process of the paper, so that an apparatus is easy to use and maintain. By means of the cavity opening formed in the outer wall of the housing, a user can selectively pull out the paper of a required length, which increases the use flexibility, and also ensures that the paper cannot be damaged due to excessive exposure. The first side wall of the housing adjacent to the cavity opening can help to perform the paper separating operation, which means that the user can separate the paper clearly without using additional tools, and improves the operation efficiency.

In some embodiments, the adhesive tape cutting assembly includes: an adhesive tape sleeving shaft which is connected to the outer wall of the housing, is selectively sleeved with an adhesive tape roll, and allows the adhesive tape roll to rotate stably so as to pull out an adhesive tape; and a knife fixing member which is arranged on the same side as the adhesive tape sleeving shaft and connected to the outer wall of the housing, a serrated knife being mounted on the knife fixing member and configured to be capable of cutting the adhesive tape pulled out from the adhesive tape roll.

In some embodiments, the adhesive tape cutting assembly further includes a protective assembly, the protective assembly being capable of hiding a cutting edge of the serrated knife when in a protective state.

In some embodiments, the protective assembly includes: a sliding member and a spring, where the sliding member moves along a sliding groove to expose the serrated knife for cutting under the action of an external force; and when the external force is removed from the sliding member, the spring provides an elastic force for the sliding member such that the sliding member is pushed back to an initial position and the cutting edge of the serrated knife is hidden.

In some embodiments, the protective assembly further includes a protective member, where the protective member constitutes a housing portion of the protective assembly and is configured to accommodate and mount the sliding member and provide a support for the spring.

In some embodiments, the adhesive tape cutting assembly further includes a mounting frame which is connected to the housing, the sliding groove is formed in the mounting frame, the sliding member is provided with a sliding rail, the sliding groove is matched with the sliding rail, and the sliding groove defines a movement range and direction of the sliding member.

In some embodiments, a reserving member is arranged on one side of the knife fixing member facing the adhesive tape sleeving shaft and is configured to attach a reserved portion of the adhesive tape after cutting.

In some embodiments, an end portion of an outer side of the adhesive tape sleeving shaft is provided with a convex edge extending outwards in a radial direction thereof, and the convex edge is configured to limit the adhesive tape roll on the adhesive tape sleeving shaft.

In some embodiments, an inner bottom wall of the housing is an inclined surface and is inclined in a direction of the cavity opening.

In some embodiments, the inner bottom wall of the housing is provided with at least two protruding inclined strips, and an arrangement direction of the inclined strips is perpendicular to a forming axis direction of the cavity opening.

It can be seen from the analysis that the present application discloses the paper separator provided with the adhesive tape cutting assembly, and paper separation and adhesive tape cutting functions are integrated in one device, so that the need of a user for switching among different tools is reduced, the working efficiency is improved, and the space of a desktop or a working area is saved. According to the integrated device, by optimizing the physical structure and technical features thereof, a more efficient, simpler and more economical method is provided to handle paper separation and adhesive tape cutting tasks.

BRIEF DESCRIPTION OF THE DRAWINGS

Drawings constituting a portion of the present application are used for providing a further understanding to the present application. Schematic embodiments of the present application and descriptions thereof are intended to explain the present application, and should not be construed to unduly limit the present application. In the drawings.

DETAILED DESCRIPTION OF EMBODIMENTS

Figure 1:
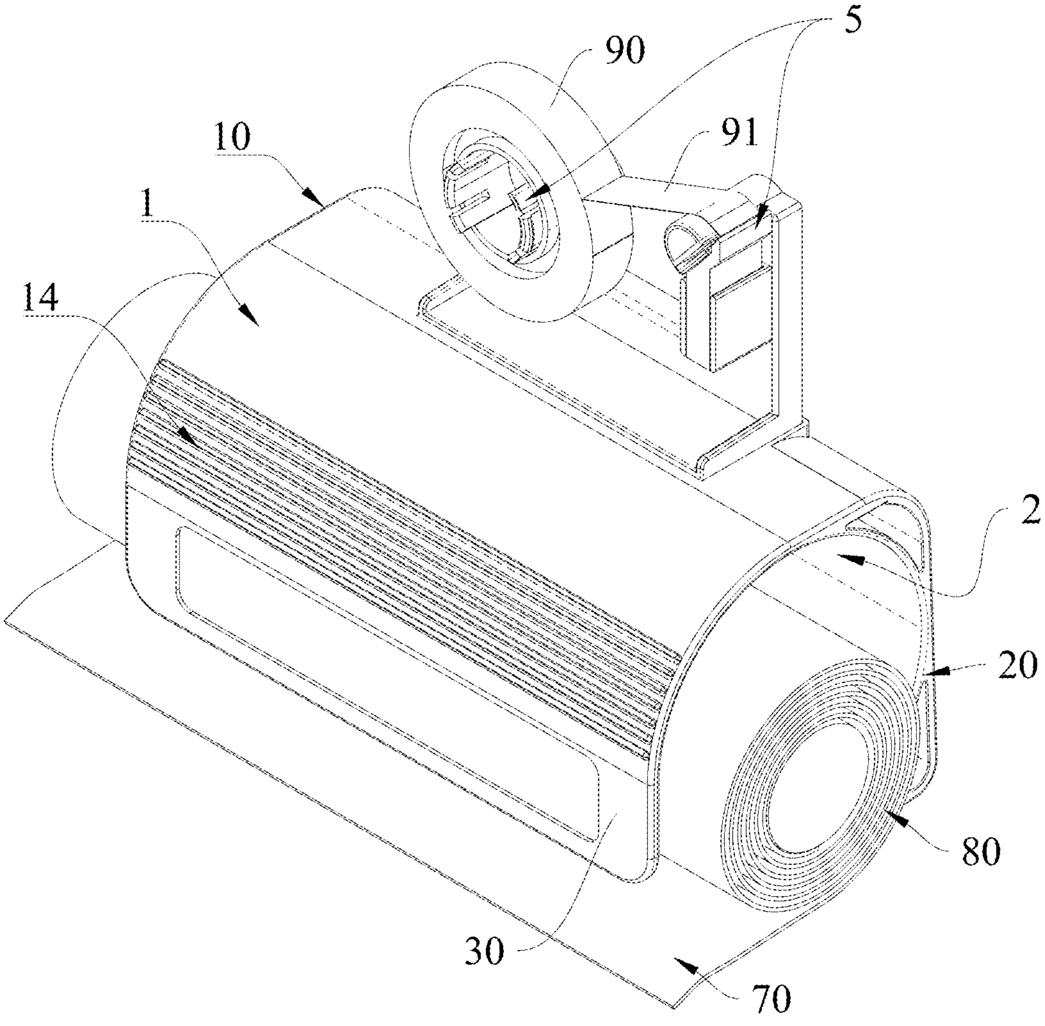
FIG. 1 is a structural schematic diagram of a paper separator provided with an adhesive tape cutting assembly, an attached adhesive tape roll and an attached paper roll in an embodiment of the present application.
Figure 2:
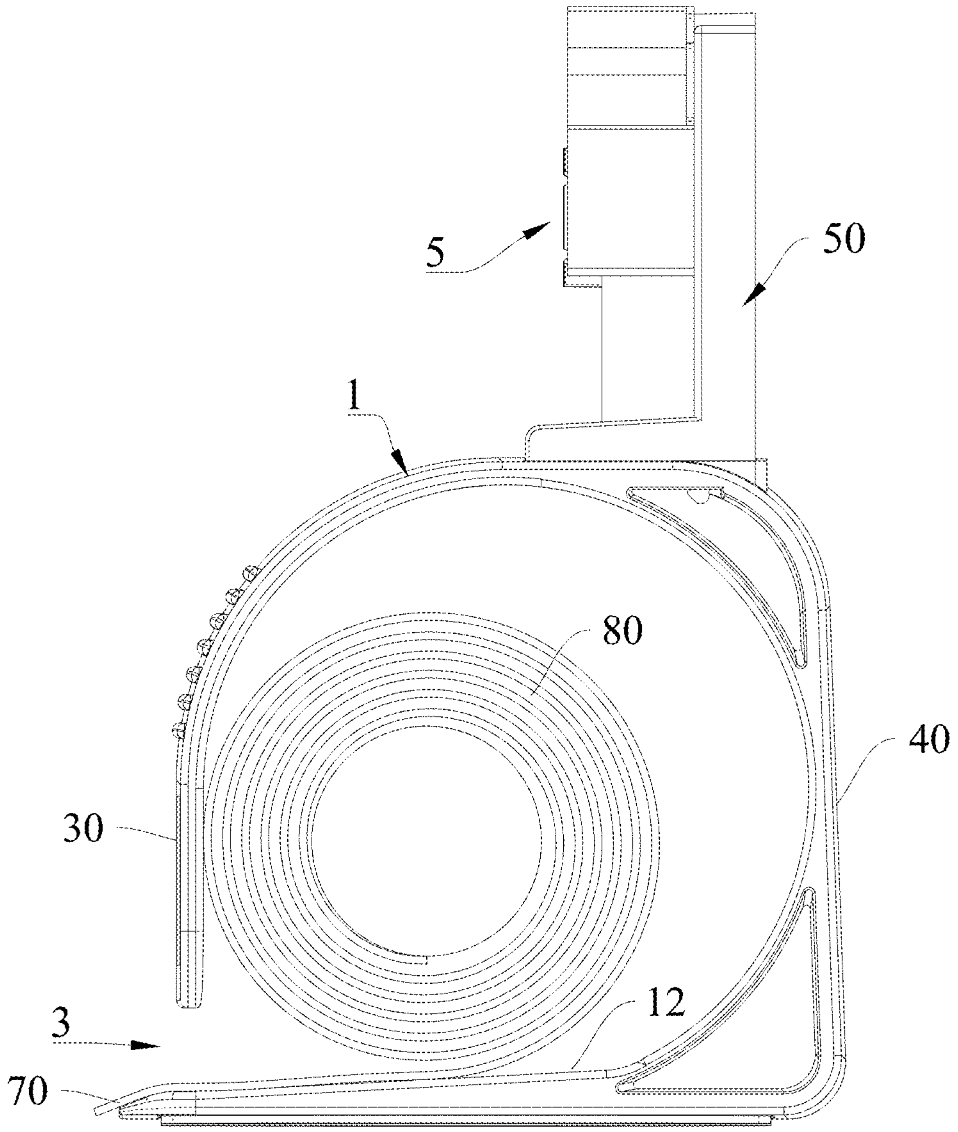
FIG. 2 is a structural schematic diagram of a structure of a paper separator provided with an adhesive tape cutting assembly, an attached adhesive tape roll and an attached paper roll in an embodiment of the present application at another angle.

The present application is described in detail below with reference to the accompanying drawings and in conjunction with embodiments. Each example is provided to explain the present application instead of limiting the present application. In fact, those skilled in the art will know that modifications and variations may be made in the present application without departing from the scope or spirit of the present application. For example, features shown or described as part of one embodiment may be used in another embodiment to produce yet another embodiment. Therefore, it is expected that the present application includes such modifications and variations that fall within the scope of the appended claims and equivalents thereof.

In the descriptions of the present application, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present application, and do not indicate that the present application must be constructed and operated in the specific orientations. Therefore, they cannot be understood as limitations on the present application. The terms "connection", "connecting" and "arrangement" used in the present application should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present application. Numeral and letter marks are used in the detailed descriptions to refer to the features in the accompanying drawings. Similar or like marks in the accompanying drawings and the descriptions have been used to refer to similar or like parts of the present application. As used herein, the terms "first", "second" and "third" and the like are used interchangeably to distinguish one member from another and are not intended to denote the location or importance of individual members.

As shown in FIG. 1 to FIG. 8, according to an embodiment of the present application, an integrated device of a paper separating component and an adhesive tape cutting component is provided and includes: a housing structure and an adhesive tape cutting assembly 5, where the housing structure includes a housing 1 which has an open first end 10 and an open second end 20, the first end 10 and the second end 20 being axially through and forming a cavity 2 capable of accommodating a paper roll inside the housing 1. The housing 1 further includes a first side wall 30 and a second side wall 40 opposite to the first side wall 30, and the accommodating cavity 2 between the first side wall 30 and the second side wall 40 allows easy loading and replacement of the paper roll 80. Such design simplifies the loading process of paper, so that an apparatus is easy to use and maintain. A cavity opening 3 is formed in an outer wall of the housing 1, axially penetrates through the outer wall of the housing 1 from the first end 10 to the second end 20, and is in communication with the accommodating cavity 2, to-be-cut paper 70 of the paper roll 80 in the accommodating cavity 2 is selectively pulled out from the cavity opening 3, and a user can selectively pull out the paper 70 of a required length, which increases the use flexibility, and also ensures that the paper 70 cannot be damaged due to excessive exposure. In addition, paper separation can be performed by means of the first side wall 30 of the housing 1 adjacent to the cavity opening 3, and then the paper 70 pulled out is cut and separated from the paper roll 80 by means of a cutting device (not shown); and the user can separate the paper 70 clearly without using additional tools, and the operation efficiency is improved. The adhesive tape cutting assembly 5 is fixedly mounted on the outer wall of the housing 1 and is configured to be sleeved with an adhesive tape roll 90 and cut an adhesive tape 91. The adhesive tape cutting assembly 5 is fixedly mounted on the outer wall of the housing, is stable and convenient to approach, and allows the user to cut the adhesive tape 91 quickly without finding independent scissors or other cutting tools.

The adhesive tape cutting assembly 5 includes a mounting frame 50 and an adhesive tape sleeving shaft 51 arranged on the mounting frame 50, the adhesive tape sleeving shaft 51 being connected to the outer wall of the housing 1 by means of the mounting frame 50 and selectively sleeved with the adhesive tape roll 90. In some embodiments, the mounting frame 50 is connected to the housing 1. In some embodiments, the mounting frame 50 is a portion of the housing 1. A sliding groove 111 is formed in the mounting frame 50.

The adhesive tape sleeving shaft 51 allows the adhesive tape roll 90 to rotate stably to pull out the adhesive tape 91. A stable support point is provided, and the stable support is crucial to keeping the position of the adhesive tape roll 90 during use and helps to achieve the precise and consistent adhesive tape pulling experience. A knife fixing member 53 is arranged on the same side as the adhesive tape sleeving shaft 51 and is connected to the mounting frame 50 on the outer wall of the housing 1, and a serrated knife 52 is mounted on the knife fixing member 53 and is configured to be capable of cutting the adhesive tape 91 pulled out from the adhesive tape roll 90. Such arrangement ensures that the user can cut the adhesive tape at the most convenient position. The serrated knife 52 mounted thereon provides an effective tool for cutting the adhesive tape 91, and the serrated design of the serrated knife 52 can ensure that the adhesive tape 91 can be clearly cut even in case of quick pulling, thereby avoiding the problem of adhesion or tearing.

In some embodiments, as shown in FIG. 3-FIG. 7, the adhesive tape cutting assembly 5 further includes a protective assembly 54, the protective assembly 54 being connected to the mounting frame 50 on the outer wall of the housing 1, being arranged on a periphery of the knife fixing member 53, and being capable of hiding a cutting edge of the serrated knife 52 in a protective state, so that the risk of accidental contact with the cutting edge is greatly reduced, which is an important security feature particularly for children or people unfamiliar with apparatus operations.

In some embodiments, as shown in FIG. 3-FIG. 7, the protective assembly 54 includes a sliding member 541, a spring 542 mounted in a spring mounting hole 5411 of the sliding member 541, and a protective member 543, the sliding member 541 is provided with a sliding rail 5412, the sliding groove 111 is matched with the sliding rail 5412 to form a sliding connection, and the sliding groove 111 precisely defines a movement range and direction of the sliding member 541. It is ensured that the sliding member moves in a predetermined path stably without deviations during operation. By limiting the movement track of the sliding member 541, unnecessary abrasions are reduced, the service life of the component is prolonged, and meanwhile, the consistency and precision of the cutting operation can be maintained. The sliding member 541 includes a side wall extension 5413, a bottom wall of the protective member 543 is provided with a notch 5432, the side wall extension 5413 abuts against an inner surface of the notch 5432 and slides in the notch 5432. The sliding rail 5412 includes a protrusion 5414, the protrusion 5414 abuts against a side wall, facing away from the serrated knife 52, of the mounting frame 50.

The protective member 543 constitutes a housing portion of the protective assembly 54 and is provided with a mounting groove 5431, and the mounting groove 5431 is configured to accommodate and mount the sliding member 541. In a natural state, the spring 542 partially extends out of the spring mounting hole 5411. When the sliding member 541 is mounted inside the mounting groove 5431, an open end of the spring mounting hole 5411 directly faces an inner wall of the protective member 543, so that the portion of the spring 542 extending out of the spring mounting hole 5411 abuts against the inner wall of the protective member 543. Thus, one end of the spring 542 is limited by a bottom wall of the sliding member 541 inside the spring mounting hole 5411, the other end is limited by the inner wall of the protective member 543, and the spring 542 is deformed or restored inside the spring mounting hole 5411. When an external force is applied to the sliding member 541, the sliding member 541 can move along the sliding groove 111 to expose the serrated knife 52 for cutting, and at the same time, the movement of the sliding member 541 can compress the spring 542. When the external force is removed from the sliding member 541, the spring 542 provides an elastic force for the sliding member 541, so that the sliding member 541 is pushed back to an initial position, and the cutting edge of the serrated knife 52 is hidden. Thus, the elastic force provided by the spring 542 can automatically reset the sliding member 541, it is ensured that the protective state of the protective assembly 54 used each time can be accurately and correctly restored, and the reliability and durability of the integrated device are improved.

The protective member 543 provides physical protection for the sliding member 541 and the spring 542 inside, prevents the influence of external factors (such as dust and foreign matters) on internal mechanisms, and also enhances the firmness of the overall structure. The protective member 543 ensures the precise cooperation and stable operation of various components, and also provides the necessary support for the spring 542, thereby ensuring that the spring can provide the consistent and reliable elastic force during operation.

A reserving member 531 is arranged on one side of the knife fixing member 53 facing the adhesive tape sleeving shaft 51 and is configured to attach a reserved portion of the adhesive tape 91 after cutting. It is ensured that a starting point of the adhesive tape can be quickly found when it is used next time, and the head of the adhesive tape does not need to be found again or handling of the messy head is avoided. The reserved portion of the adhesive tape 91 is attached by the reserving member 531, so that the user can store the adhesive tape tidily when it is not in use, the adhesive tape is prevented from adhering to an unnecessary object, and meanwhile, the cleanliness of an operation environment can be kept.

An end portion of an outer side of the adhesive tape sleeving shaft 51 is provided with a convex edge 511 extending outwards in a radial direction thereof, and the convex edge 511 is configured to limit the adhesive tape roll 90 on the adhesive tape sleeving shaft 51 and ensure the accurate mounting position thereof on the adhesive tape sleeving shaft 51, thereby supporting the stable rotation of the adhesive tape roll, and reducing the jamming or breakage risk caused by the position deviation.

Figure 3:
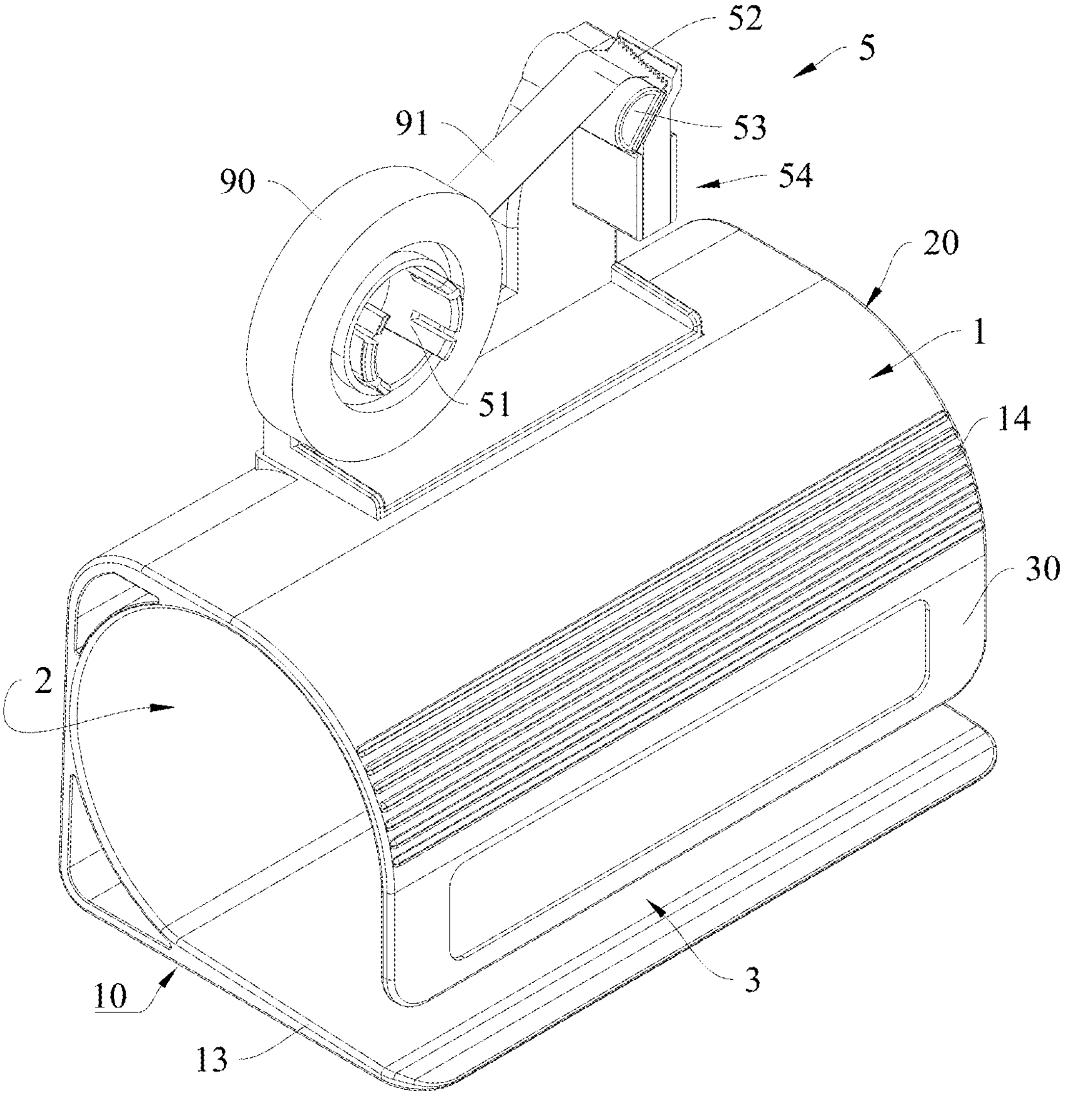
FIG. 3 is a structural schematic diagram of a paper separator provided with an adhesive tape cutting assembly in an embodiment of the present application.
Figure 4:
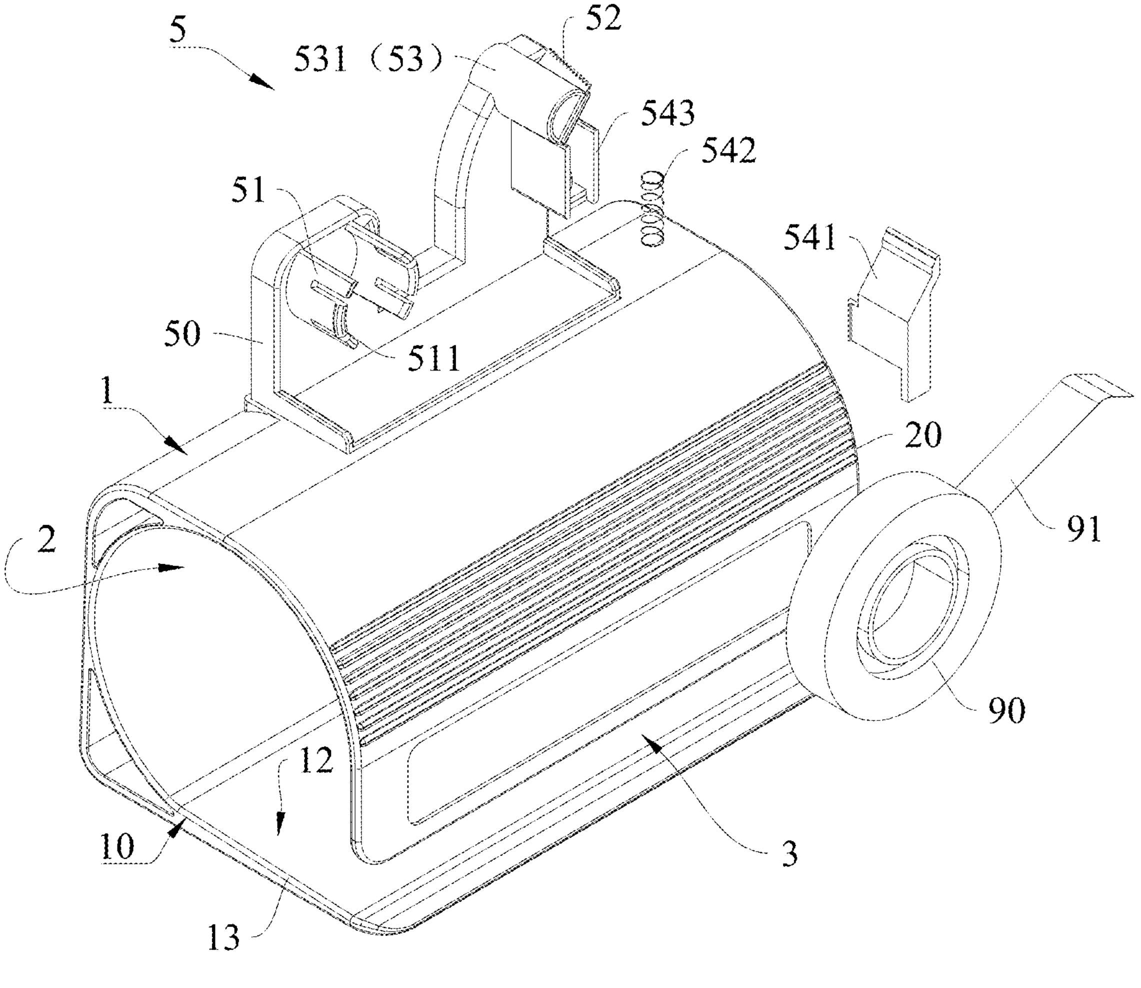
FIG. 4 is an exploded structural schematic diagram of an adhesive tape cutting device of a paper separator provided with an adhesive tape cutting assembly in an embodiment of the present application.
Figure 5:
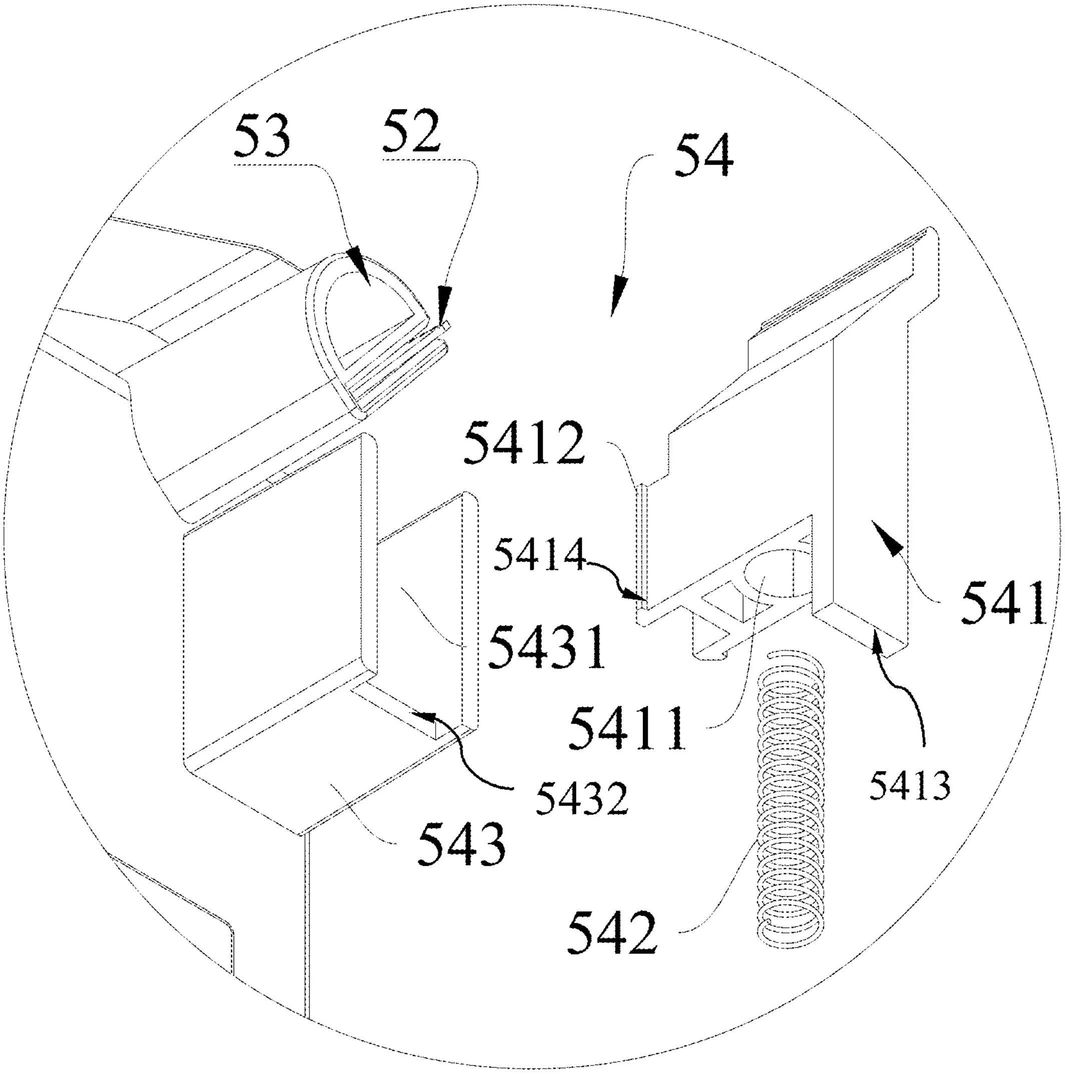
FIG. 5 is an exploded structural schematic diagram of a protective component of a paper separator provided with an adhesive tape cutting assembly in an embodiment of the present application.
Figure 6:
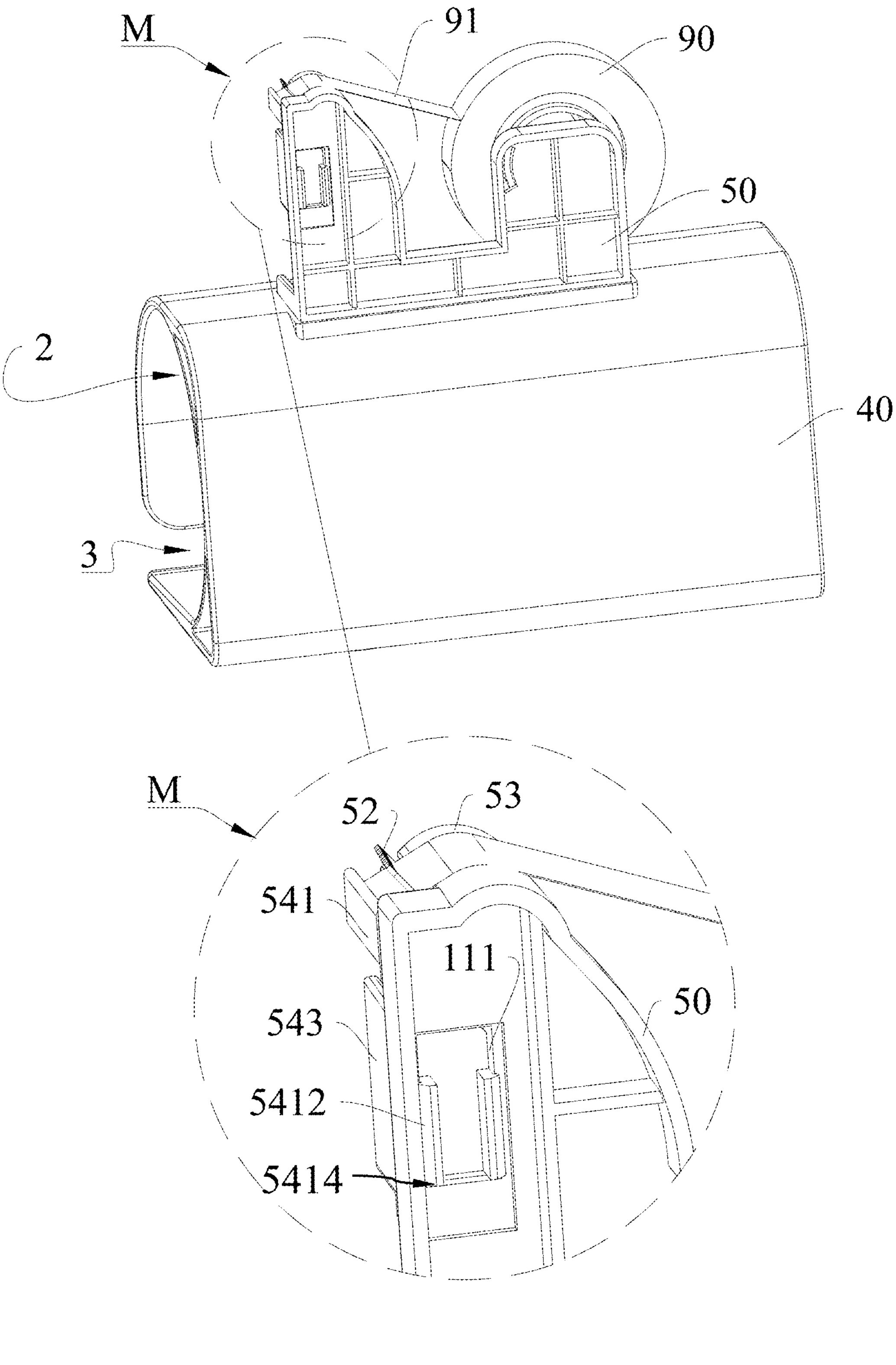
FIG. 6 is a schematic diagram of an integrated device when a force is applied to a protective component and an enlarged view at part M in an embodiment of the present application.
Figure 7:
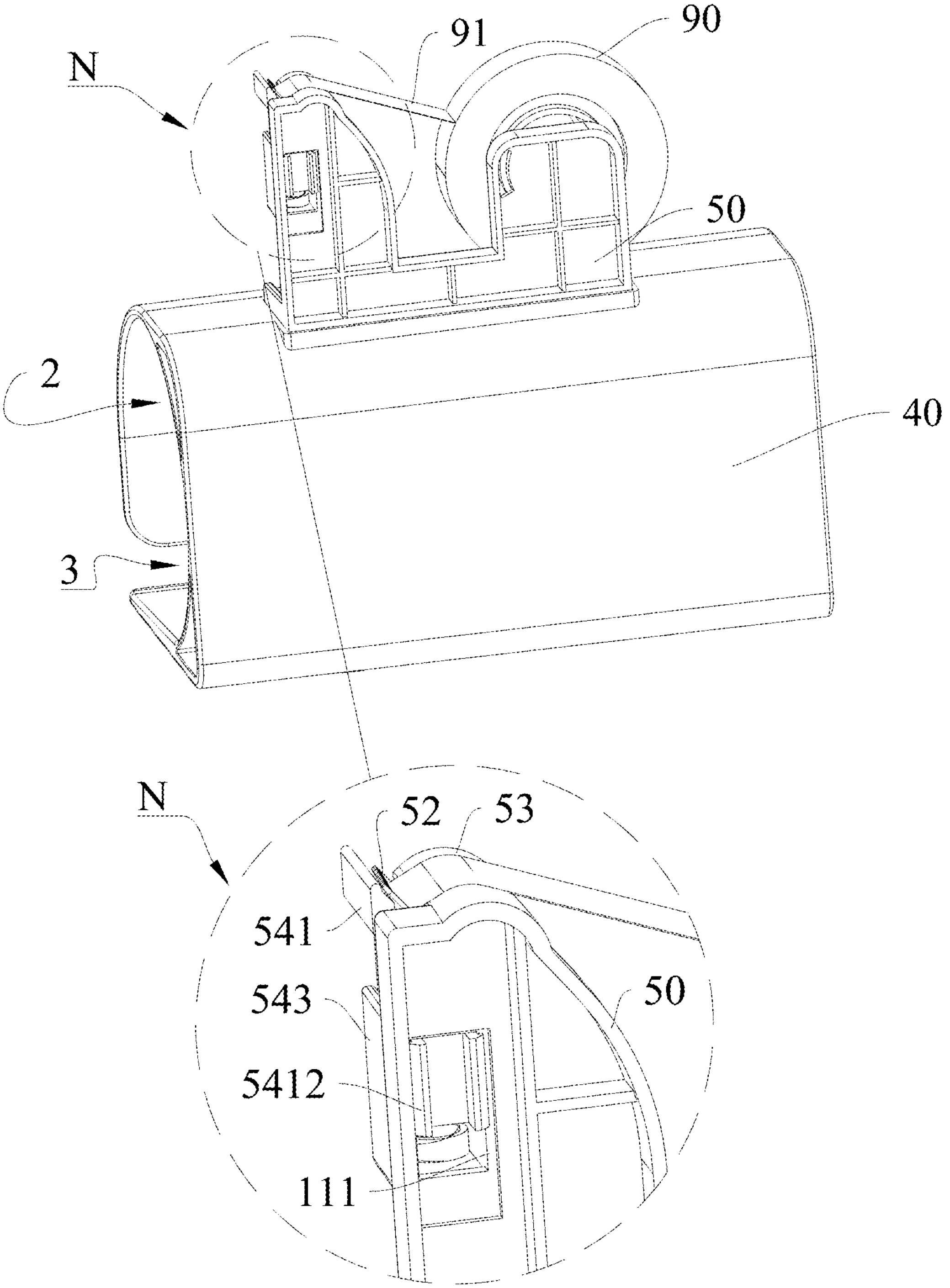
FIG. 7 is a schematic diagram of an integrated device in a protective state and an enlarged view at part N in an embodiment of the present application.

As shown in FIG. 3 and FIG. 4, an inner bottom wall 12 of the housing 1 is an inclined surface and is inclined in a direction of the cavity opening 3. The design of the inclined surface helps to reduce the contact area between the bottom of the paper roll 80 and the inner bottom wall 12 of the housing 1, thereby reducing the friction force. Thus, the user can pull out the paper 70 from the cavity opening 3 more smoothly, and the jamming or resistance is reduced. The inclined surface is inclined in the direction of the cavity opening 3 and can continuously and naturally guide the paper roll 80 to move towards the cavity opening 3 and towards the inner wall of the first side wall 30, thereby ensuring that the paper 70 can be pulled out along the correct path each time, and avoiding the problem of deviation or winding of the paper 70.

The inner bottom wall 12 of the housing 1 is provided with two protruding inclined strips 13, and an arrangement direction of the inclined strips 13 is perpendicular to a forming axis direction of the cavity opening 3. The protruding design of the inclined strips 13 can reduce the contact area between the inclined surface of the inner bottom wall 12 and the paper so as to reduce the overall friction force. The inclined strips 13 can achieve a certain separation effect when the paper 70 is pulled out, and help the user to separate the paper 70 more easily, and this feature is particularly useful when the thick or sticky paper 70 is handled. The inclined strips 13 can naturally guide the paper 70 to move towards the cavity opening 3, thereby ensuring that the paper 70 can be pulled out along the correct path each time, and avoiding the problem of deviation or winding of the paper.

An outer bottom wall 13 of the housing 1 is a plane for supporting the integrated device. By means of the outer bottom wall 13 configured to be the plane, the device can adapt to different types of desktops or platforms, and the stable support can be provided regardless of smooth surfaces and slightly coarse surfaces, so that the application range of the product is enlarged.

Figure 8:
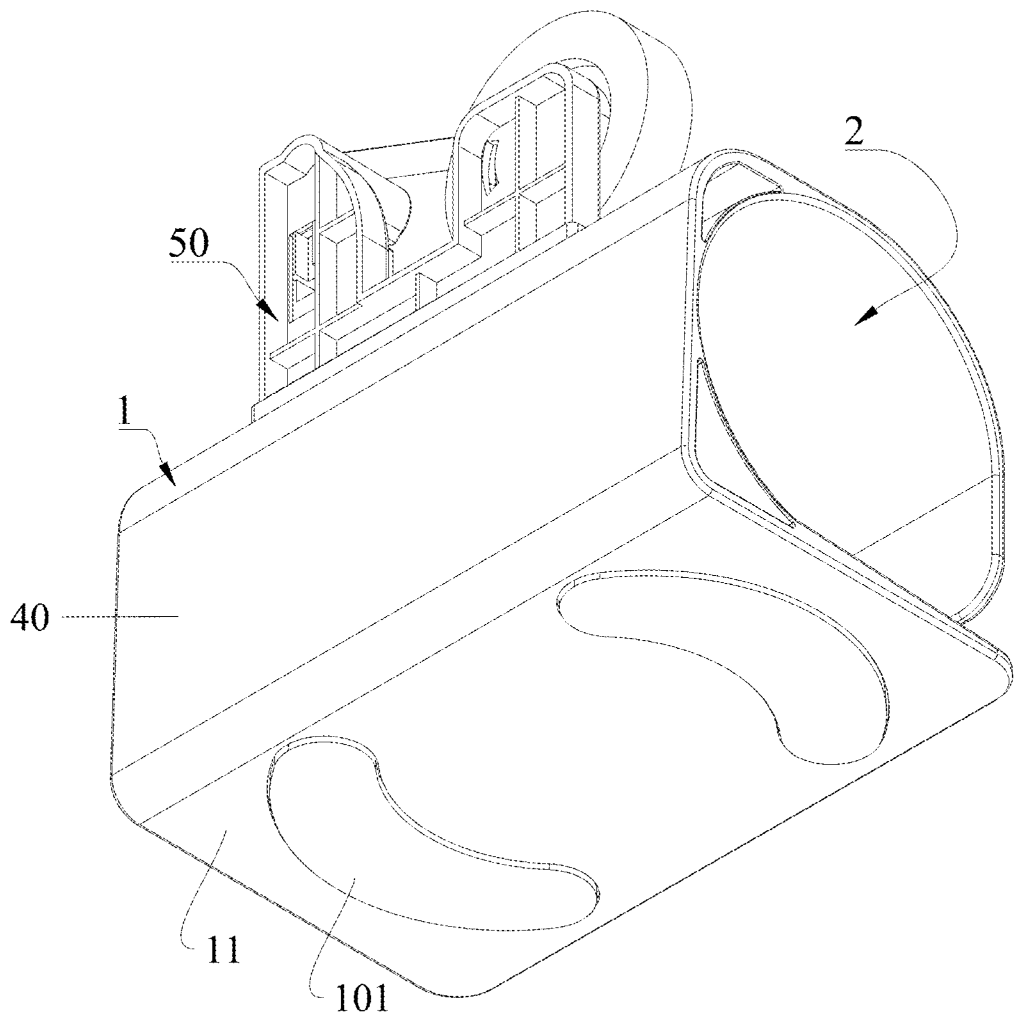
FIG. 8 is a schematic diagram of a paper separator provided with an adhesive tape cutting assembly in an embodiment of the present application at another angle.

As shown in FIG. 8, the outer bottom wall 13 of the housing 1 is further provided with a non-slip pad 101. The non-slip pad 101 increases the friction force between the integrated device and a placement surface, thereby ensuring that even on a smooth surface, the integrated device can be kept stable and cannot slide or move easily.

In some embodiments, as shown in FIG. 1 or FIG. 3, the outer wall of the first side wall 30 or the second side wall 40 of the housing 1 is further provided with non-slip lines 14. The non-slip lines 14 increase the friction force between a hand of the user and the outer side wall of the housing, so that the device is easier to hold firmly when being picked up or moved, particularly under the condition of wet hand or oily hand. The non-slip lines 14 are not only functional design elements, but also add details and professionalism to the appearance of the device, and show the focus on the user experience in the product design. The non-slip lines 14 are usually made of a wear-resistant material, and can keep the good non-slip performance after long-term use.

It can be seen from the above description that the working principle of the paper separator provided with the adhesive tape cutting assembly disclosed in the present application is as follows: the user places the paper roll into the accommodating cavity inside the housing 1. The inner bottom wall 12 is designed as the inclined surface which is inclined in the direction of the cavity opening 3, which helps to reduce the friction force between the bottom of the paper roll 80 and the inner bottom wall 12 of the housing 1, and meanwhile, naturally guides the paper 70 to move towards the cavity opening 3. The paper 70 is selectively pulled out by the user from the cavity opening 3 formed in the outer wall of the housing 1. During pulling-out, the paper 70 passes through the first side wall 30 of the housing 1 to be separated, and it is ensured that the paper 70 is neatly separated. The integrated device can also be provided with a paper cutting device to cut the paper 70 pulled out. The adhesive tape roll 90 is sleeved on the adhesive tape sleeving shaft 51 and can rotate stably thereon, so that the user can easily pull out the adhesive tape 91 of the required length. When the adhesive tape 91 needs to be cut, the user applies the external force to enable the sliding member 541 to move along the sliding groove 111, and then the serrated knife 52 is exposed for cutting. The external force can compress the spring 542 when driving the sliding member 541 to move, so that once the external force disappears, the spring 542 can automatically push the sliding member 541 back to the initial position, and the cutting edge of the serrated knife 52 is hidden again to ensure the security. The reserved portion of the adhesive tape 91 after cutting can be attached by the reserving member 531 on the knife fixing member 53, so that the head of the adhesive tape can be quickly found when it is used next time.

The above are merely some embodiments of the present application and are not intended to limit the present application, and various changes and variations may be made on the present application by those skilled in the art. Any modification, equivalent substitution, improvement, etc. made within the spirit and principles of the present application should fall within the scope of protection of the present application.

What is claimed is:

1. A paper separator provided with an adhesive tape cutting assembly, comprising: a housing structure and an adhesive tape cutting assembly, wherein the housing structure comprises:

a housing which has an open first end and an open second end, the first end and the second end being axially through and forming a cavity capable of accommodating a paper roll inside the housing; and a cavity opening which is formed in an outer wall of the housing, is axially formed from the first end to the second end, and is in communication with the accommodating cavity, to-be-cut paper of the paper roll in the accommodating cavity being selectively pulled out from the cavity opening, and paper separation being performed by means of a first side wall of the housing adjacent to the cavity opening; and the adhesive tape cutting assembly is fixedly mounted on the outer wall of the housing and is configured to be sleeved with an adhesive tape roll and cut an adhesive tape;

the adhesive tape cutting assembly comprises a serrated knife and a protective assembly; the protective assembly comprises a protective member and a sliding member; the sliding member is mounted on a sliding groove and moves along the sliding groove to expose the serrated knife for cutting under an action of an external force;

the sliding member comprises a side wall extension, a bottom wall of the protective member is provided with a notch, the side wall extension abuts against an inner surface of the notch and sides in the notch; wherein the adhesive tape cutting assembly further comprises a mounting frame which is connected to the housing, the sliding groove is formed in the mounting frame, the sliding member is provided with a sliding rail, the sliding groove is matched with the sliding rail, and the sliding groove defines a movement range and direction of the sliding member; wherein the sliding rail comprises a protrusion, the protrusion abuts against a side wall, facing away from the serrated knife, of the mounting frame.

2. The paper separator provided with an adhesive tape cutting assembly according to claim 1, wherein the adhesive tape cutting assembly further comprises:

an adhesive tape sleeving shaft which is connected to the outer wall of the housing, is selectively sleeved with the adhesive tape roll, and allows the adhesive tape roll to rotate stably so as to pull out the adhesive tape; and a knife fixing member which is arranged on the same side as the adhesive tape sleeving shaft and connected to the outer wall of the housing, wherein the serrated knife is mounted on the knife fixing member and configured to be capable of cutting the adhesive tape pulled out from the adhesive tape roll.

3. The paper separator provided with an adhesive tape cutting assembly according to claim 2, wherein the protective assembly is connected to the housing and arranged on a periphery of the knife fixing member, and is capable of hiding a cutting edge of the serrated knife when in a protective state.

4. The paper separator provided with an adhesive tape cutting assembly according to claim 2, wherein a reserving member is arranged on one side of the knife fixing member facing the adhesive tape sleeving shaft and is configured to attach a reserved portion of the adhesive tape after cutting.

5. The paper separator provided with an adhesive tape cutting assembly according to claim 2, wherein an end portion of an outer side of the adhesive tape sleeving shaft is provided with a convex edge extending outwards in a radial direction thereof, and the convex edge is configured to limit a lateral movement of the adhesive tape roll along a longitudinal axis of the adhesive tape sleeving shaft.

6. The paper separator provided with an adhesive tape cutting assembly according to claim 1, wherein the protective assembly further comprises:

a spring, wherein when the external force is removed from the sliding member, the spring provides an elastic force for the sliding member such that the sliding member is pushed back to an initial position and the cutting edge of the serrated knife is hidden.

7. The paper separator provided with an adhesive tape cutting assembly according to claim 6, wherein the protective member is fixedly connected to the housing, constitutes a housing portion of the protective assembly, and is configured to accommodate and mount the sliding member and provide a support for the spring.

8. The paper separator provided with an adhesive tape cutting assembly according to claim 1, wherein an inner bottom wall of the housing is an inclined surface and is inclined in a direction of the cavity opening.

9. The paper separator provided with an adhesive tape cutting assembly according to claim 8, wherein the inner bottom wall of the housing is provided with at least two protruding inclined strips, and an arrangement direction of the inclined strips is perpendicular to a forming axis direction of the cavity opening.

10. The paper separator provided with an adhesive tape cutting assembly according to claim 1, wherein an outer bottom wall of the housing is a plane for supporting an integrated device.

11. The paper separator provided with an adhesive tape cutting assembly according to claim 1, wherein an outer bottom wall of the housing is further provided with a non-slip pad.

12. The paper separator provided with an adhesive tape cutting assembly according to claim 1, wherein an outer side wall of the housing is further provided with non-slip lines.

* * * * *